March 24, 1959     F. A. KROHM     2,878,833

VALVE STRUCTURE IN A FLUID MOTOR

Original Filed May 11, 1949

INVENTOR.
FRED A. KROHM
BY
Charles S. Penfold
ATTORNEY

United States Patent Office 2,878,833
Patented Mar. 24, 1959

2,878,833

VALVE STRUCTURE IN A FLUID MOTOR

Fred A. Krohm, Hobart, Ind., assignor, by mesne assignments, to The Anderson Company, a corporation of Indiana Original application May 11, 1949, Serial No. 92,634. Divided and this application October 11, 1954, Serial No. 461,393

6 Claims. (Cl. 137—624)

This invention relates generally to power units, and more particularly, has to do with valve structure preferably adapted for use with a windshield wiper motor of the fluid type.

This application is a division of my copending application Serial No. 92,634 filed May 11, 1949, now abandoned.

An object of the invention is to provide a primary valve seal and a valve embodying improved principles of design and construction whereby it may be caused to automatically adjust and seal itself with respect to the seat, including means extending through the valve into the body for detachably holding the valve in place.

A significant object of the invention is to provide a primary valve and a control assembly with unique means for operatively connecting the valve with the control assembly.

Another object of the invention is to provide a set-up whereby the unique means employed for operatively connecting the valve and control assembly together may be manipulated to either of two positions for predetermining the rotational range of the primary valve.

Other objects and advantages of the invention will become apparent after the description hereinafter set forth is considered in conjunction with the drawings annexed hereto.

Figure 1:
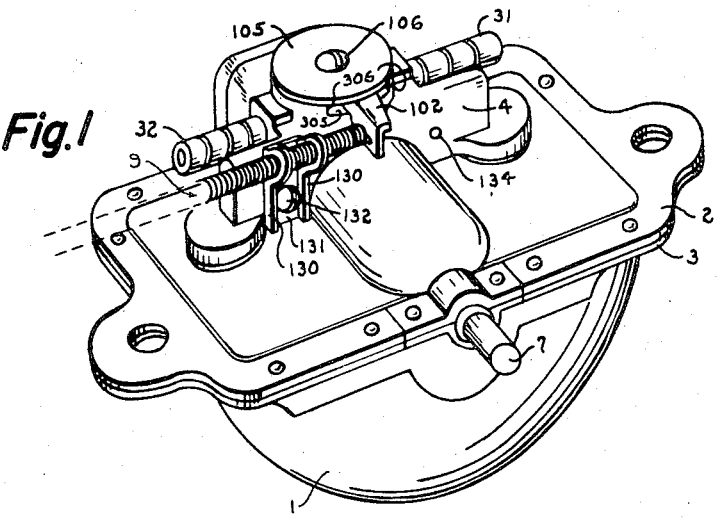
Figure 2:
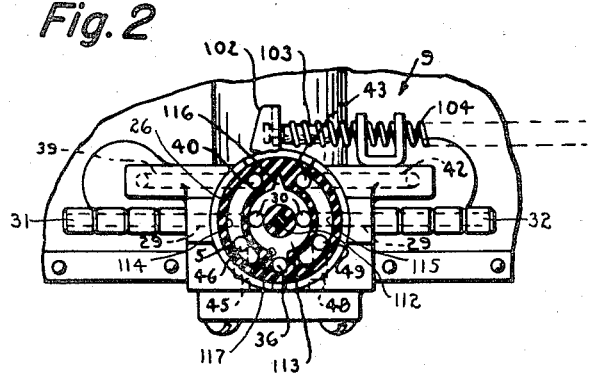
Figure 3:
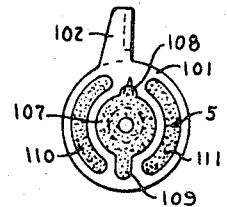

Referring to the drawings, wherein like parts are designated by the same numerals, Figure 1 is a perspective view of the motor assembly embodying the invention;

Figure 2 is a top view of a part of the motor assembly illustrating a neutral position of the valve therein; and Figure 3 is a view showing the primary valve assembled with an operating lever.

The motor structure exemplified in the drawings includes, among other things, a housing 1, a cover 2, a mounting frame 3 permanently secured to the housing, a valve body 4 detachably secured to the cover, a primary or throttle valve 5 carried by the valve body, a mechanism or valving device actuated by a driving shaft 7 for controlling a secondary valve, and a control unit 9 operatively connected to the primary valve.

The upper part of the valve block is provided with a circular recess 26, which rotatably receives the throttle or primary valve 5 above referred to. As will be pointed out hereinafter, the valve block is provided with a plurality of passages which communicate with the recess 26 and a chamber in the motor and the secondary valve. The manual control unit 9 serves to actuate the throttle valve to control the operation of the motor.

The unique arrangement of the various passages in the valve body or block will now be considered. The block is provided with a pair of aligned longitudinal passages 29, which communicate with the recess 26 by vertical passages 30 disposed on opposite sides of the center of the recess. The opposite ends of the longitudinal passages are preferably enlarged to receive nipples 31 and 32 in order that a flexible conduit extending from a source of suction may be connected to either of the nipples depending on the installation. A detachable rubber cap may be utilized to cover the nipple which is not used.

The block 4 is provided with an L-shaped vertical passage, the upper end of which communicates with the circular recess 26 at a port 36 equally spaced from the vertical passages 30, and its lower end connects with a center hole provided in a mounting plate which supports the valving device. The block is also provided with a generally Z-shaped passage 39, one end of which communicates with the circular recess 26 at port 40 and its other end communicates with the chamber in the motor chamber. A passageway 42, similar to and aligned with passageway 39, communicates with the circular recess 26 at port 43 and the motor chamber. A vane (not shown) is carried by the shaft 7 for oscillation in the chamber. It will be noted that the aligned passages 29 are arranged substantially parallel to the passages 39 and 42.

The valve block is further provided with a passageway 45, one end of which communicates with the circular recess 26 at a port 46, and its other end with an aperture provided in the mounting plate. A passageway 48, similar to passageway 45, communicates with the throttle valve recess at a port 49 and an aperture provided in the plate. The L-shaped and Z-shaped passages, various apertures, including the mounting plate, valving device and secondary valve, are fully exemplified and described in my application above referred to.

The primary valve 5 may be constructed in various ways but as herein illustrated, is preferably made round and of neoprene or some other desirable resilient material that will tend to automatically adjust and seal itself with respect to its seat. A metal lever having a round flat portion 101 is interlocked with the valve and includes an offset tab 102, the latter being provided with an opening which is adapted to receive a connector 103 attached to the inner end of helical flexible control member 104 constituting a component of the manual control unit 9. A plate 105 overlies the valve 5 and engages the valve block and holds the valve and lever assembled in the valve recess 26. A pivot screw 106 extends through plate 105, lever and valve and into the valve block. The interlock between the lever and valve is preferably accomplished by providing the upper side of the valve with a plurality of raised or elevated portions, including a round central portion 107 having diametrically disposed radial portions 108 and 109 and corresponding arcuate portions 110 and 111, all of such portions being received in clearance openings in the lever having shapes corresponding to these portions.

The throttle valve 5 is provided with a tubular center core portion 112 and its underside with an annular recess 113 surrounding the core. When the motor is in operating condition as exemplified in Figures 2 and 3, the passages 29 leading to the vacuum supply means and passage 35 leading to the secondary valve will be placed in communication with the annular recess 113 through ports 30 and 36 respectively. The valve is further provided with a pair of separate corresponding arcuate recesses 114 and 115 disposed substantially concentric to the annular recess 113. Attention is directed to the fact that the annular recess is provided with diametrically disposed connecting recesses 116 and 117, which will be described more in detail subsequently. The annular recess is at all times in communication with the passages 29 leading to the vacuum means. Attention is further directed to the fact that these recesses substantially correspond in shape and size with the raised or elevated portions 107 through 111 provided on the upper surface of the resilient primary valve 5.

The opening in the tab 102 includes a slot so that a reduced portion of the connector 103 may be received in the slot and the tab 102 will be held between abutments provided on the connector. With this arrangement, a detachable easily workable coupling or connection is established between the flexible control member 104 and the tab 102 of the primary valve 5. The connector 103 is preferably of a diameter not in excess of the diameter of the flexible member 104 in order that the connector will pass through threaded apertures formed in the legs 130 of a fitting 131 secured to the valve block 4 by a screw 132. The flexible member threadedly engages the threaded apertures and is of such a character that a knob adjacent its outer end may be disposed in any location on the instrument panel desired for convenient operation. Attention is directed to the fact that the valve block is provided with a threaded opening 134 so that the fitting 131 may be connected to another part of the block depending on which of the nipples 31 and 32 is connected to the vacuum means.

The manual control unit 9 provides means whereby the throttle or primary valve 5 may be accurately controlled to govern the operation of the motor. The operation of the motor and parking features thereof are comparatively simple and will now be described.

To operate the motor, the throttle valve 5 is rotated to the position illustrated in Figure 2 by the flexible member 104 to connect the annular recess 113, which is at all times in communication with the vacuum, with port 36 through recess 117, port 36 leading to a hole in the mounting plate through the L-shaped passage, thereby connecting a secondary valve of the valving device with hole and aperture in the mounting plate, this aperture 47 with port 46 through passageway 45, port 46 to port 40 through arcuate recess 114 in the valve, and port 40 to one of the chamber ports through passageway 39, to establish a through line of communication from passage 29 to the secondary valve and the chamber port 41 to cause the vane, previously in a parked position to be sucked or pivoted in one direction. The moment the secondary valve is moved over one of the apertures in the mounting plate, the other chamber port is placed in communication with the vacuum to cause the vane to oscillate in the opposite direction and just before the vane completes its stroke the valving device will cause the secondary valve to move over another of the apertures in the mounting plate so that the vacuum will pivot the vane back to said one direction through the agency of the other passages and ports above described. In other words, and as specifically described in the application above referred to, the secondary valve of the valving device is moved relative to various apertures in the mounting plate to control and effect oscillation of the vane.

When the throttle valve is in the position illustrated in Figure 2, the vane will be caused to automatically oscillate within the chamber to actuate the drive shaft 7. It is of course to be understood, that when the valve is in the position just referred to, the shaft will be oscillating at its maximum speed. To reduce the rate of oscillation, it is merely necessary to move the throttle valve 5 in a direction to reduce the strength of the suction at the chamber ports. The recess 116 communicating with recess 113 is preferably V-shaped so that the passage of air between recess 113 and either of the ports 40 and 43 leading to passages 39 and 42 may be easily regulated, and so that a wiper arm and blade assembly connected to the shaft 7 may be eased or slowly moved to the desired parking position.

Having thus described my invention, it is obvious that various modifications may be made in the same without departing from the spirit of the invention, and, therefore, I do not wish to be understood as limiting myself to the exact form, construction, arrangement, and combinations of parts herein shown and described and defined in the claims.

I claim:

1. A resilient valve member, a recess provided adjacent one side of the member for operatively connecting and disconnecting passages, means substantially corresponding to the shape of the recess and reenforcing it extending from its opposite side, and a lever provided with an opening receiving said extending means for interlocking the valve member and lever.

2. Valve structure comprising a body provided with a seat with passages leading to the seat, a resilient valve disposed on the seat and provided with a recess for connection and disconnection with the passages, said valve having a raised portion reenforcing the recess, a lever having a portion interengaged with the raised portion of the valve and also having a portion offset from the valve for attachment to a control for operating the valve, and fastening means extending through the valve into the body for holding the valve on the seat.

3. The structure defined in claim 2, including the provision of means integral with the body engageable by the offset portion of the lever for determining the travel limits of the valve and lever, and in which the fastening means also extends through the lever for holding the lever and valve assembled on the seat.

4. Valve structure comprising a body provided with a threaded aperture and a round recess with passages leading to the base of the recess, a substantially flat resilient valve rotatable in the recess and provided with a recess in one side thereof for connecting the passages, said valve also having an opposite side provided with an abutment extending from the recess and reenforcing it, a member having an opening receiving said abutment to interconnect the valve and member and also having a portion for attachment to a control for operating the valve, and fastening means extending through the valve and lever having a threaded end engaging the threaded aperture for holding the valve in the recess and the lever assembled with the valve.

5. A valve assembly comprising a substantially flat valve provided with a recess of a predetermined configuration in one side thereof, the other side of the valve being provided with a raised portion defining the base wall of the recess, and an operating lever overlying the valve and provided with an opening receiving the raised portion, said raised portion and said opening substantially conforming to the configuration of the recess.

6. Valve structure comprising a body having a round recess with an annular wall extending from the recess, said wall being provided with an opening, passages intersecting the base of the recess, a resilient valve rotatable in the recess and formed to connect and disconnect the passages, a lever provided with a portion attached to the valve and a radial portion extending through the opening, a control assembly, a pair of individual means carried by the body, and a fitting connectible to either of said means for supporting the control assembly in a manner whereby the latter can be attached to the radial portion of the lever in either of two positions.

References Cited in the file of this patent

UNITED STATES PATENTS

| | | |
|---|---|---|
| 711,755 | Blake | Oct. 21, 1902 |
| 1,142,910 | Putnam | June 15, 1915 |
| 1,790,705 | Heywood | Feb. 3, 1931 |
| 2,108,182 | Searle | Feb. 15, 1938 |
| 2,146,983 | Pick | Feb. 14, 1939 |
| 2,271,331 | Elliott | Jan. 27, 1942 |
| 2,351,732 | Almond | Jan. 20, 1944 |
| 2,564,445 | Parsons | Aug. 14, 1951 |
| 2,706,532 | Ringo | Apr. 19, 1955 |